US005594058A

United States Patent [19]
Olsen et al.

[11] Patent Number: 5,594,058
[45] Date of Patent: Jan. 14, 1997

[54] POLYPHENYLENE RESINS FROM VINYLETHYNYLBENZENE, DIETHYNYLBENZENE AND PHENYLACETYLENE

[75] Inventors: Robert E. Olsen, Placerville; Harlan F. Reese, Sacramento; Stephen J. Backlund, Fair Oaks, all of Calif.

[73] Assignee: Aerojet- General Corporation, Sacramento, Calif.

[21] Appl. No.: 207,324

[22] Filed: Jun. 15, 1988

[51] Int. Cl.$^6$ .............. C08F 38/04; C08F 4/44; C08K 5/01; C08L 49/00
[52] U.S. Cl. .............. 524/481; 427/385.5; 524/483; 526/160; 526/285
[58] Field of Search .............. 252/182.13, 182.18, 252/183.11; 526/285, 160; 525/912; 423/448, 453; 524/481, 483

[56] References Cited

U.S. PATENT DOCUMENTS

| | | | |
|---|---|---|---|
| 2,404,392 | 7/1946 | Maximoff | 526/285 |
| 3,278,641 | 10/1966 | Bell, Jr. | 526/285 X |
| 3,705,131 | 12/1972 | Korshak et al. | 260/47 |
| 3,821,153 | 6/1974 | White | 524/481 |
| 3,933,957 | 1/1976 | White | 423/448 X |
| 4,026,859 | 5/1977 | Cessna, Jr. | 524/111 |
| 4,108,942 | 8/1978 | Chalk et al. | 260/875 |
| 4,273,906 | 10/1978 | Economy et al. | 526/285 |

FOREIGN PATENT DOCUMENTS

| | | |
|---|---|---|
| 2133236 | 12/1972 | France . |
| 2043494 | 5/1971 | Germany . |
| 2235429 | 1/1973 | Germany . |

OTHER PUBLICATIONS

A. J. Chalk et al., "A New Simple Synthesis of Soluble High Molecular Weight Polyphenylenes by the Cotrimerization of Mono- and Bifunctional Terminal Acetylenes," J. Polymer Sci., vol. 10, 2033–2043 (1972).

W. Bracke, "Synthesis of Soluble, Branched Polyphenyls," J. Polymer Sci., vo. 10, 2097–2101 (1972).

D. A. Frey et al., "Preparation and Aromatization of Poly-1, 3–Cyclohexadiene," J. Polymer Sci., vol. 1, 2057–2065 (1963).

P. Kovacic, "Polymerization of Benzene to p–Polyphenyl by Ferric Chloride," J. Organic Chem., vol. 28, 1864–67 (1963).

G. A. Edwards, "Polyphenyl," J. Polymer Sci., vol. XVI, 589–597 (1955).

N. Bilow, "Ablative Phenolic and Polyphenylene Resins," Hughes Aircraft Company Technical Report AFM-L–TR–65–8 (1965).

V. V. Korshak, "The Principal Characteristics of Polycyclotrimerization," Vysokomol. soyed, A16:No. 5, 926–943 (1974).

A. E. Newkirk, "Thermal Degradation of Poly(m–diethynylene Benzene)," J. Polymer Sci., vol. 2, 2217–2233 (1964).

A. Furlani, "Aromatization Reactions of Acetylenic Hydrocarbons . . . ," Polymer Letters, vol. 5, 523–526 (1967).

C. I. Simionescu et al., "Polymerization of Acetylenic Derivatives.XXX. Isomers of Polyphenylacetylene," J. Polymer Sci., vol. 15, 2497–2509 (1977).

V. V. Korshak et al., "Synthesis of Branched Oligophenylenes with Double Bonds," Vysokomol. Soedin, Ser.B., 16(3), 201–4 (1974).

V. A. Sergeev, "Polycyclotrimerization of Acetylenic Compounds," Dokl. Vses. Konf. Khim. Atsetilena, 4th., 3 (1972).

Primary Examiner—Richard D. Lovering
Attorney, Agent, or Firm—Townsend and Townsend and Crew LLP

[57] ABSTRACT

A novel polyphenylene resin is formed by the polycyclotrimerization of vinylethynylbenzene, diethynylbenzene and phenylacetylene. Polymerization is carried out under conditions which result in the retention of unreacted vinyl groups from the vinylethynylbenzene component, which are then susceptible to crosslinking. The polymer is useful in the formation of high-performance carbon—carbon composites, producing an unusually high char yield with advantageous handling and processing characteristics.

36 Claims, No Drawings

POLYPHENYLENE RESINS FROM VINYLETHYNYLBENZENE, DIETHYNYLBENZENE AND PHENYLACETYLENE

This invention relates to polyphenylene resins for use in forming high-density carbon materials.

BACKGROUND OF THE INVENTION

High-density carbon-carbon composites are extremely strong materials capable of withstanding high temperatures. Such composites find use in the manufacture of structural parts for high-performance use, high-performance coatings, semi-conductor encapsulators and high-performance insulators. Examples of structural parts made from these materials are as heat shields for reentry vehicles and solid propellant rocket motor nozzles.

These composites are formed from resins, phenolic resins being in general use at present, by pyrolysis. Certain qualities of the resins are significant in terms of their processing and performance as well as the characteristics of the final product. These resin qualities include solubility, flow characteristics, and char yield upon pyrolysis of the resin, as well as mechanical properties of the final product. A high char yield, or low volatiles content, is particularly important, since it relates to the minimization of weight loss shrinkage, pores and cracking upon graphitization.

The phenolic resins in current use generally have char yields of less than 50%, due to the release of such decomposition products as water, carbon monoxide, phenol and methane upon pyrolysis and carbonization. With such a high quantity of volatiles produced, the resulting composite is porous, low in density and susceptible to stress due to matrix shrinkage. To compensate for these deficiencies, the composite after first having been formed is impregnated with coal tar pitch and repyrolysed (i.e., "densified"). Five to seven densification cycles are generally required to achieve a product with thermostructural properties adequate for high performance use.

SUMMARY OF THE INVENTION

Novel resins based on aromatic acetylene hydrocarbon structures are provided herein. These resins are generally prepared from a combination of three monomers—(a) a vinylethynylbenzene, (b) a diethynylbenzene, and (c) phenylacetylene, with structural formulas as follows:

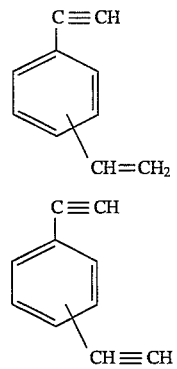

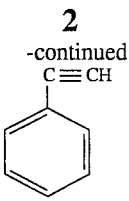

The phenylacetylene functions solely as a chain terminator, whereas the vinylethynylbenzene functions as both a chain terminator and a provider of crosslinking sites. The monomers are polymerized in such a manner as to leave at least a substantial portion of the vinyl groups of the vinylethynylbenzene unreacted, preferably at least about 50%, most preferably at least about 75%. The relative amounts of the monomers are preferably selected to achieve average molecular weights ranging from about 2,000 to about 100,000, preferably from about 5,000 to about 50,000.

The resin offers a number of advantageous properties which distinguish it from both phenolic resins commonly used in carbon-composite materials and other polyphenylene resins. Included among these properties are the fact that the resin is formed by relatively low-temperature polymerization, and once formed is soluble in common solvents. In addition, the resin crosslinks at a relatively low temperature, and produces an unusually high char yield upon pyrolysis. The result upon carbonization and graphitization is a product which needs little densification, and has unusually high structural integrity. The highly aromatic nature of the resin further imparts thermal and chemical stability during processing. The absence of heteroatoms further contributes to the ease of processing, by reducing the presence of impurities which interfere with densification.

The high char yield causes very low shrinkage of the final product. This permits use of the resin in forming parts and components which cannot be formed using the conventional materials such as the phenolic resins. Air frame components are one example. The high char yield also imparts very high strength to the product.

DETAILED DESCRIPTION OF THE INVENTION AND PREFERRED EMBODIMENTS

In accordance with the present invention, the resin is formed by the polycyclotrimerization of the three monomers. The structure of the resulting polymer will depend on the relative amounts of the monomers as well as the polymerization conditions. A typical structure, however, will consist of phenyl rings linked together by single bonds between vertices of adjoining rings. The linked ring structure will include rings linked to one other ring, as well as rings linked to two other rings and rings linked to three other rings. For rings bearing multiple linkages, the linkages may be at adjacent vertices on the ring, or at vertices separated by one or more unlinked vertices. The linked ring structure will also include vinyl groups (—CH═CH$_2$) bonded to ring vertices through single bonds. These groups are referred to herein as "terminal" vinyl groups. A typical structure is as follows:

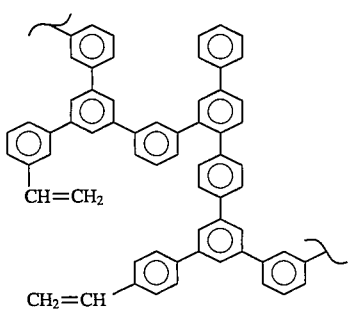

The vinylethynylbenzene and diethynylbenzene are conveniently prepared as a mixture. As stated above, the ratio of these two components will vary depending on the characteristics sought for the resin which results upon polymerization. In most cases, a mixture in which the diethynyl component comprises from about 30% to about 85% by weight will provide the best results, with about 50% to about 75% by weight preferred. The positions of the ring substituents may be either ortho-, meta- or para- with respect to each other. The meta- and para- isomers are preferred. Particularly preferred is a mixture of meta- and para- isomers, since such a mixture promotes increased solubility of the resulting resin in organic solvents, and increased flexibility of the resulting polymers in all stages tip to carbonization. Technical grade divinylbenzene is particularly useful for the preparation of the mixture of (a) and (b). This material is a mixture of divinyl and vinylethylbenzenes with minor amounts of diethylbenzenes and naphthalene. The divinylbenzenes are present in greater amounts than the vinylethylbenzenes, and the meta-isomers predominate.

The monomer mixture of the preceding paragraph (components (a) and (b) above) may be conveniently prepared from a mixture of divinylbenzene and ethylvinylbenzene by bromination followed by dehydrobromination, according to conventional procedures. Addition of bromine to the carbon—carbon double bonds occurs rapidly at room temperature in carbon tetrachloride solution. Bromination at the ethyl group may be accomplished by the use of a free-radical initiator or by refluxing in carbon tetrachloride, the free-radical reaction occurring more rapidly. Dehydrobromination is then achieved by the use of a non-nucleophilic base, such as potassium t-butoxide or a phase transfer catalyst with powdered potassium hydroxide. The product may then be extracted with hexane, then purified by distillation or chromatography.

The phenylacetylene functions solely as a chain terminator to control the molecular weight of the resulting polymer, and properties associated therewith. Further control of the molecular weight may be achieved by using a combination of phenylacetylene with vinylacetylene, rather than phenylacetylene alone. As stated above, the relative proportion of chain terminator with respect to the total monomer composition will vary depending on the desired characteristics of the resulting polymer. The relative amounts may be expressed as a ratio of monofunctional to difunctional monomers, the monofunctional monomers including the vinylethynyl monomer (monomer (a) above) as well as the phenylacetylene (and vinylacetylene, when included). The ratio may vary, provided that it is high enough to prevent the formation of a gel, yet low enough to avoid products with low melting points and poor thermal stability. In most cases, a ratio of monofunctional species to difunctional species ranging from about 1 to about 2 will provide the best results.

Conditions for the polymerization reaction will be selected to retain as many vinyl groups as possible. Polymerization may be effected by the action of a Ziegler-type catalyst. Preferred Ziegler catalysts are complexes of titanium and aluminum compounds, particularly titanium halides and alkyl aluminum compounds. The preferred catalyst is a complex of titanium tetrachloride and a trialkyl aluminum, with the alkyl group being either ethyl or isobutyl.

The reaction may be conducted over a broad temperature range, although higher temperatures will generally leave fewer available vinyl groups in the resulting polymer, and are less desirable for this reason. A preferred temperature range is from about −10° C. to about 40° C. While other reaction conditions may vary, the reaction is generally conducted under an inert atmosphere, at atmospheric pressure. Upon completion, the reaction may be quenched with acid.

At the completion of the reaction, the polymer may be isolated and purified in accordance with conventional techniques. For example, the product solution may be purified by extraction with water and the product then precipitated in methanol to yield a cream-colored or yellow powder. Further purification and fractionation may be achieved by the portionwise addition of methanol to a toluene solution of the polymer.

In its preferred form, the polymer will have a molecular weight ranging from about 2,000 to about 100,000, preferably from about 5,000 to about 50,000, with a softening point ranging from about 200° C. to about 300° C.

Once formed, the polymer is preferably dissolved in a solvent to facilitate processing. Conventional organic solvents may be used. A particularly preferred solvent, however, is the monomer mixture referred to above, which can be conveniently formed from technical grade divinylbenzene. This solvent is preferred for purposes of further polymerization, since it introduces no heteroatoms. Preferred solutions are those in which the polymer comprises from about 25% to about 75% by weight, with about 40% to about 60% by weight particularly preferred.

The polymer may be processed into high-performance structural materials in accordance with conventional techniques used in forming carbon—carbon composites. In accordance with such techniques, a carbon filler, such as finely divided graphite, for example, is generally used to increase the resin density, toughness and char yield. Typical procedures for cure and pyrolysis would be curing at a temperature of about 100°–200° C., carbonization at a temperature of about 800°–1,000° C., then forming the carbonized resin into the desired structure, followed by graphitization at 1800°–2500° C.

The following examples are offered for purposes of illustration, and are not intended to limit the invention in any manner.

EXAMPLE 1

A. Preparation of Monomer Mixture

To a 1-liter, round bottomed flask fitted with an addition funnel, thermometer, stirrer, an ice-water cooling bath and a $N_2$ purge connected to a caustic trap, was charged 500 mL of carbon tetrachloride and 100 g of technical-grade divinylbenzene (analysis shown in Table 1). The solution was cooled to 10° C., and bromine (256 g, 1.6 mol) was added dropwise, maintaining the reaction temperature at less than 20° C. by controlling the rate of addition. Benzoyl peroxide (5.0 g, 20.6 mmol) was added, and the mixture slowly heated to reflux (79° C.). (Caution: HBr evolved). The process was monitored by capillary column gas chromatography, and when conversion to α-bromoethyl-1,2-dibromoethylbenzene reached 99%, heating was discontinued. After cooling to ambient, the reaction mixture was washed with 100 mL of 25% caustic solution and then twice with 250 mL aliquots of water. The solution was dried (MgSO₄) and stripped to yield 317 g (102%) of yellow solid.

To a 3-liter, round bottomed flask fitted with high speed agitation, a reflux condensor, thermometer and static $N_2$ head was charged 600 mL of petroleum ether, 135 g of brominated divinylbenzene, 6.6 g (0.012 mol) of tetraoctyl ammonium bromide and 316 g (5.6 mol) of powdered potassium hydroxide. The rapidly stirred mixture was heated to reflux (75°–80° C.) until the reaction was complete (~3 hours) as shown by capillary column gas chromatography. The mixture was filtered, the filter cake washed with 100 mL of petroleum ether, and the combined filtrates stripped to yield 31.2 g (88% yield) of pale yellow liquid.

TABLE 1

Capillary Column Gas Chromatograph Area Percent Analysis of Technical-Grade Divinylbenzene and Monomer Mixture

| Starting Material | Area % | Monomer Mixture | Area % |
|---|---|---|---|
| m-divinyl | 41.2 | m-diethynyl | 46 |
| p-divinyl | 15.4 | p-diethynyl | 15 |
| m-vinylethyl | 30.9 | m-vinylethynyl | 29 |
| p-vinylethyl | 8.5 | p-vinylethynyl | 9 |
| m-diethyl | 0.9 | m, p-divinyl | <1 |
| p-diethyl | 0.9 | | |
| naphthalene | 1.6 | naphthalene | <1 |

B. Preparation of Vinylpolyphenylene

To a dry 5-liter, round bottomed flask fitted with an addition funnel, stirrer, thermometer, a static $N_2$ head, and a rubber septum for addition via a syringe, was charged 1.5 L of toluene, 114 mL (0.114 mol) of titanium tetrachloride 1.0 molar in toluene, and 342 mL (0.342 mol) of tri-isobutylaluminum 1.0 molar in toluene. The mixture was cooled to 5° C., and a solution of 150 g of the monomer mixture of part A above (0.714 mol diethynylbenzene and 0.460 mol vinylethynylbenzene), 100 g (0.969 mol) of phenylacetylene in 50 mL of toluene, was added over a one-hour period, maintaining the temperature below 25° C. The solution was post-stirred for one hour, then quenched by the addition of 8 mL of concentrated hydrochloric acid in 75 mL of methanol. A thick brown slurry resulted from the quench. The slurry was washed with two 1-liter aliquots of water, then 1 L of 6N hydrochloric acid, and finally 1 L of water. The thin toluene-product slurry was then added to 6 L of methanol (containing 3 mL of concentrated hydrochloric acid) which precipitated the vinylpolyphenylene as a yellow solid. The mixture was filtered, and the filter cake washed with 2L of methanol. The product was dried in vacuum at 50° C. to constant weight to give 237.4 g (95.0% yield).

Product analysis yielded the following results:

Vinyl content: Bromine titration showed 1.81 mmol olefin per gram (98% vinyl retention of polymer)

Ash content: 0.84 weight %

Molecular weight: ~24000, range 68,000 to 1,000. Based on polystyrene standard.

Softening point, °C.: 202°–240°

Solubility: 0.45 g/g toluene at 30° C.; 0.62 g/g toluene at 50° C.

Thermal stability tests yielded the following results:

TABLE 2

Thermal Stability

| Post-cure Time at 325° C., hours | Solubility in Toluene, g/g @ 30° C. | Temperature of 10% wt. loss, °C. | Weight Retention (%) At 600° C. | 1000° C. |
|---|---|---|---|---|
| 0 | 0.45 | 455 | 78.0 | — |
| 6 | insoluble | 495 | 74.0 | — |
| 30 | insoluble | 527 | 84.2 | 66.6 |

EXAMPLE 2

Part B of Example 1 was repeated, using diisobutylaluminum chloride in place of the tri-isobutylaluminum. Molecular weight determination and bromine titration revealed that all vinyl groups were incorporated into the polymerization, leaving no vinyl groups available for crosslinking.

Part B of Example 1 was again repeated, using the catalyst system indicated in that example, varying the temperature. Vinyl group retention was determined by bromine titration, with the results shown in Table 3.

TABLE 3

Vinyl Content vs. Reaction Temperature

| Temperature (°C.) | Vinyl Content (% of original) |
|---|---|
| 2 | 96 |
| 4 | 80 |
| 24 | 82 |
| 36 | 50 |
| 46 | 48 |

EXAMPLE 3

Thermal and free-radical crosslinking of the vinyl groups were compared in terms of the thermal stability of the resulting product. Thermal curing under argon at 325° C. for 30 hours was shown to increase the temperature of 10% weight loss (as determined by thermal gravimetric analysis, or "TGA") from an initial 425° C. to 527° C. and to convert the readily soluble polymer (45 weight % in toluene at 30° C.) to a totally insoluble cross-linked material. These data, tabulated below, show that: (1) vinyl crosslinking has occurred, and (2) such crosslinking increases thermal stability.

TABLE 4

Effect of Thermal Cure on Vinylpolyphenylene Stability and Solubility

| Time at 325° C., Hr. | Toluene Solubility at 30° C., Wt. % | Temperature of 10% Wt. Loss, °C. |
|---|---|---|
| 0 | 45 | 425 |
| 6 | insoluble | 495 |
| 30 | insoluble | 527 |

Use of free-radical initiators (benzoyl peroxide and 1,1'-azobis(cyclohexane)carbonitrile) were also successful in cross-linking the vinyl groups. The resulting product again showed marked insolubility and increased thermal stability to the 500°–550° C. range.

EXAMPLE 4

In a series of runs, part B of Example 1 was repeated with varying ratios of the phenylacetylene to the monomer mixture. The results are listed in Table 5, where the ratio is expressed as a mole ratio of monofunctional to difunctional species, the former representing both phenylacetylene and vinylethynylbenzene. In Run 1, the ratio is that inherent in the monomer mixture itself (no phenylacetylene was used at all). In Run 5, the phenylacetylene was replaced by a mixture of phenylacetylene and vinylacetylene at a mole ratio of 1.6. Run 4 indicates that a mono- to difunctional ratio of 10 (using phenylacetylene as chain terminator) produces a polymer with few terminal vinyl groups available for crosslinking, with low melting point and low thermal stability.

TABLE 5

Variation of Ratio of Chain Terminator to Monomer

| Run | Mole Ratio Mono-to Difunctional | Average Molecular Weight | Melting (Softening) Point, °C. | Solubility (g/g toluene at 30° C.) | Vinyl Content (mmol/g) |
|---|---|---|---|---|---|
| 1 | 0.6 | (gel formation) | | | |
| 2 | 1 | 48,000 | (244–285) | 0.24 | 2.5 |
| 3 | 2 | 5,000 | (202–240) | 0.45 | 1.8 |
| 4 | 10 | ~700 | 77–85 | >0.45 | 0.34 |
| 5* | 10 | ~1000 | 85–125 | >0.45 | 3.08 |

*A mixture of phenylacetylene and vinylacetylene was used as chain terminator.

EXAMPLE 5

Resins were prepared by dissolving the product of Example 1 in the monomer mixture to give a clear, viscous solution. Samples of the solution weighing 6 to 10 grams were then cast into films, placed in an autoclave and cured at various temperatures and pressures, with heating up to temperature and cooling being spread out over 8 hours to minimize exotherms and fracture due to thermal shock. Thermal gravimetric analyses were then performed with the results shown in Table 6.

TABLE 6

| Resin Composition (wt %) | | | Cure Conditions | Density (g/cc) | TGA Analysis* Temp. for 10% wt. loss | % Wt. Retention 600° C. | % Wt. Retention 1000° C. |
|---|---|---|---|---|---|---|---|
| Monomer | Polymer | Graphite | | | | | |
| — | 100 | — | uncured | — | 455 | 74.0 | — |
| — | 100 | — | (a) | — | 495 | 78.0 | — |
| — | 100 | — | (b) | — | 527 | 84.1 | 66.7 |
| 40 | 60 | — | (c) | 1.12 | 490 | 79.0 | — |
| 50 | 50 | — | (c) | 1.12 | 500 | 84.2 | 79.1 |
| 60 | 40 | — | (c) | 1.12 | 495 | 86.0 | — |
| 45 | 45 | 10 | (d) | 1.22 | — | 87.0 | 83.0 |
| 40 | 40 | 20 | (d) | 1.27 | — | 91.2 | 87.8 |
| 35 | 35 | 30 | (d) | 1.29 | — | 92.0 | 88.6 |

*TGA heating rate 10° C./min
Cure Conditions:
(a) 325° C., 6 h under $N_2$
(b) 325° C., 30 h under $N_2$
(c) 90° C., 16 h at 200 psig $N_2$; 16 h at 200 psig $N_2$
(d) Pyrolysis; 600° C., 4–6 h under Ar The foregoing is offered primarily for purposes of illustration. It will be readily apparent to those skilled in the art that numerous variations, modifications and substitutions may be made in the materials, procedural steps and conditions described herein without departing from the spirit and scope of the invention.

What is claimed is:

1. A polyphenylene polymer formed by the copolymerization of the following monomers

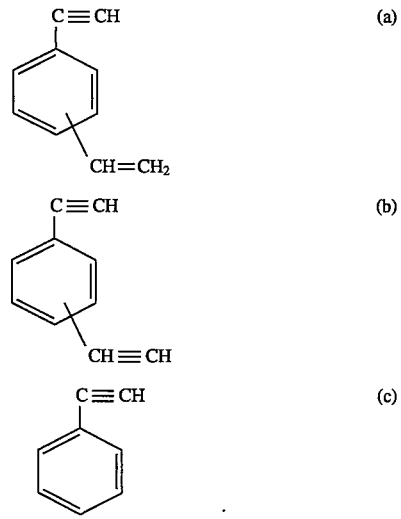

said polymer containing at least a substantial portion of the vinyl groups of monomer (a) unreacted.

2. A polyphenylene polymer in accordance with claim 1 in which at least about 50% of said vinyl groups remain unreacted.

3. A polyphenylene polymer in accordance with claim 1 in which at least about 75% of said vinyl groups remain unreacted.

4. A polyphenylene polymer in accordance with claim 1 having an average molecular weight of from about 2000 to about 100,000.

5. A polyphenylene polymer in accordance with claim 1 having an average molecular weight of from about 5000 to about 50,000.

6. A polyphenylene polymer in accordance with claim 1 in which monomer (b) comprises from about 30% to about 85% by weight of monomers (a) and (b) combined.

7. A polyphenylene polymer in accordance with claim 1 in which monomer (b) comprises from about 50% to about 70% by weight of monomers (a) and (b) combined.

8. A polyphenylene polymer in accordance with claim 1 in which the mole ratio of monomers (a) plus (c) to monomer (b) is from about 1 to about 2.

9. A polyphenylene polymer in accordance with claim 1 in which monomers (a) and (b) are independently meta-isomers, para-isomers or a combination thereof.

10. A process for forming a polyphenylene polymer containing pendent vinyl groups susceptible to crosslinking, said process comprising copolymerizing the following monomers

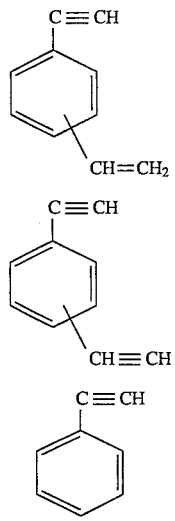

under conditions selected to leave at least a substantial portion of the vinyl groups of monomer (a) unreacted.

11. A process in accordance with claim 10 in which said conditions are selected to leave at least about 50% of said vinyl groups unreacted.

12. A process in accordance with claim 10 in which said conditions are selected to leave at least about 75% of said vinyl groups unreacted.

13. A process in accordance with claim 10 in which said conditions are selected to provide said polymer with an average molecular weight of from about 2000 to about 100,000.

14. A process in accordance with claim 10 in which said conditions are selected to provide said polymer with an average molecular weight of from about 5000 to about 50,000.

15. A process in accordance with claim 10 effected by the action of a Ziegler catalyst.

16. A process in accordance with claim 15 in which said Ziegler catalyst is a complex of a titanium compound and an aluminum compound.

17. A process in accordance with claim 15 in which said Ziegler catalyst is a complex of a titanium halide and an alkylaluminum compound.

18. A process in accordance with claim 15 in which said Ziegler catalyst is a complex of titanium tetrachloride and a trialkylaluminum.

19. A process in accordance with claim 15 in which said Ziegler catalyst is a complex of titanium tetrachloride and $R_3Al$ where $R_3$ is a member selected from the group consisting of ethyl and isobutyl.

20. A process in accordance with claim 10 in which monomer (b) comprises from about 30% to about 85% by weight of monomers (a) and (b) combined.

21. A process in accordance with claim 10 in which monomer (b) comprises from about 50% to about 70% by weight of monomers (a) and (b) combined.

22. A process in accordance with claim 10 in which the mole ratio of monomers (a) plus (c) to monomer (b) is from about 1 to about 2.

23. A process in accordance with claim 10 effected by the action of a Ziegler catalyst and in which said conditions include a temperature maintained within the range of about −10° C. to about 40° C.

24. A process in accordance with claim 10 in which monomers (a) and (b) are independently either meta-isomers, para-isomers or a combination thereof.

25. A process in accordance with claim 10 further comprising copolymerizing vinylacetylene with said monomers.

26. A polyphenylene resin solution comprising a copolymer of (a) a monomer mixture comprising

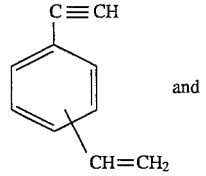

and

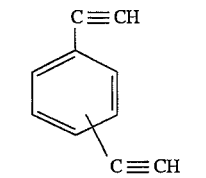

and (b) a chain terminator having the formula

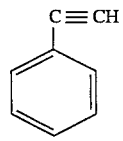

said copolymer containing at least a substantial portion of the vinyl groups of monomer (i) unreacted, and said copolymer dissolved in a further amount of said monomer mixture.

27. A polyphenylene resin solution in accordance with claim 26 in which said copolymer contains at least about 50% of said vinyl groups unreacted.

28. A polyphenylene resin solution in accordance with claim 26 in which said copolymer contains at least about 75% of said vinyl groups unreacted.

29. A polyphenylene resin solution in accordance with claim 26 in which said copolymer has an average molecular weight of from about 2000 to about 100,000.

30. A polyphenylene resin solution in accordance with claim 26 in which said copolymer has an average molecular weight of from about 5000 to about 50,000.

31. A polyphenylene resin solution in accordance with claim 26 in which monomer (ii) comprises from about 30% to about 85% by weight of said monomer mixture.

32. A polyphenylene resin solution in accordance with claim 26 in which monomer (ii) comprises from about 50% to about 70% by weight of said monomer mixture.

33. A polyphenylene resin solution in accordance with claim 26 in which the mole ratio of monomer (i) plus said chain terminator to monomer (ii) is from about 1 to about 2.

34. A polyphenylene resin solution in accordance with claim 26 in which said copolymer comprises from about 25% to about 75% by weight of said polyphenylene resin solution.

35. A polyphenylene resin solution in accordance with claim 26 in which said copolymer comprises from about 46% to about 60% by weight of said polyphenylene resin solution.

36. A polyphenylene resin solution in accordance with claim 26 in which said copolymer further incorporates vinylacetylene.

* * * * *

UNITED STATES PATENT AND TRADEMARK OFFICE
CERTIFICATE OF CORRECTION

PATENT NO. : 5,594,058

DATED : January 14, 1997

INVENTOR(S) : Robert E. Olsen, Harlan F. Reese and Stephen J. Backlund

It is certified that error appears in the above-identified patent and that said Letters Patent is hereby corrected as shown below:

Column 1, line 66: change "CH≡CH" to --C≡CH--,

Column 8, line 56: change "CH≡CH" to --C≡CH--, and claim 10 at Column 9, line 29: change "CH≡CH" to --C≡CH--.

Signed and Sealed this

Sixth Day of May, 1997

Attest:

Attesting Officer

BRUCE LEHMAN

Commissioner of Patents and Trademarks